United States Patent [19]

Bigley

[11] Patent Number: 5,740,895
[45] Date of Patent: Apr. 21, 1998

[54] INTEGRATED WHEEL END SYSTEM

[75] Inventor: Jon A. Bigley, Canton, Mich.

[73] Assignee: Warn Industries, Milwaukie, Oreg.

[21] Appl. No.: 651,384

[22] Filed: May 22, 1996

[51] Int. Cl.⁶ .................... B60K 17/26; B60K 23/06
[52] U.S. Cl. .................... 192/69.41; 192/69.42;
  192/69.9; 192/84.92; 192/84.961; 192/85 V;
  192/91 A; 403/1
[58] Field of Search .................... 192/69.4, 69.41,
  192/69.42, 69.9, 40, 84.92, 84.96, 84.961,
  85 A, 85 V, 88 A, 90, 91 A; 403/1; 180/247;
  301/124.1, 126, 132, 135

[56] References Cited

U.S. PATENT DOCUMENTS

| | | | |
|---|---|---|---|
| 2,978,276 | 4/1961 | Huffman | 301/1 |
| 3,718,213 | 2/1973 | Hegar et al. | 192/67 R |
| 4,116,320 | 9/1978 | Quilliam | 192/89 A |
| 4,213,514 | 7/1980 | Ehrlinger et al. | 180/308 |
| 4,273,460 | 6/1981 | Ueno | 403/1 |
| 4,282,949 | 8/1981 | Kopich et al. | 192/69.41 X |
| 4,441,597 | 4/1984 | Teraoka | 192/35 |
| 4,561,520 | 12/1985 | Fogelberg | 180/247 |
| 4,627,512 | 12/1986 | Clohessy | 180/247 |
| 4,692,049 | 9/1987 | Engle | 403/1 |
| 4,775,040 | 10/1988 | Telford | 192/67 R |
| 4,817,752 | 4/1989 | Lobo et al. | 180/247 |
| 4,960,192 | 10/1990 | Kurihara | 192/85 V X |
| 5,141,088 | 8/1992 | Kurihara et al. | 192/67 R |
| 5,353,890 | 10/1994 | Clohessy | 180/247 |
| 5,394,967 | 3/1995 | Bigley | 192/67 R |

Primary Examiner—Richard M. Lorence
Attorney, Agent, or Firm—Robert L. Harrington

[57] ABSTRACT

An integrated wheel end system for a vehicle including a clutch adapted to provide driving engagement/disengagement of a wheel to convert between driven and non-driven modes of wheel movement. A support is coupled to the vehicle frame and an elongate spindle is mounted in a bearing in the support. The outer end of the spindle is adapted to have a wheel mounted thereon, and the inner end of the spindle has a radially outwardly extending flange having engaging elements arrayed about its periphery. A driven axle has a plurality of engaging elements arrayed about its periphery adjacent the flange of the spindle. A sliding clutch member is shiftable between a driving position in which it concurrently engages the engaging elements on the axle and spindle flange to provide a driving connection therebetween, and a non-driving position where such concurrent engagement does not exist. A selectively activated actuator is provided for moving the clutch member between its driving and non-driving positions.

23 Claims, 2 Drawing Sheets

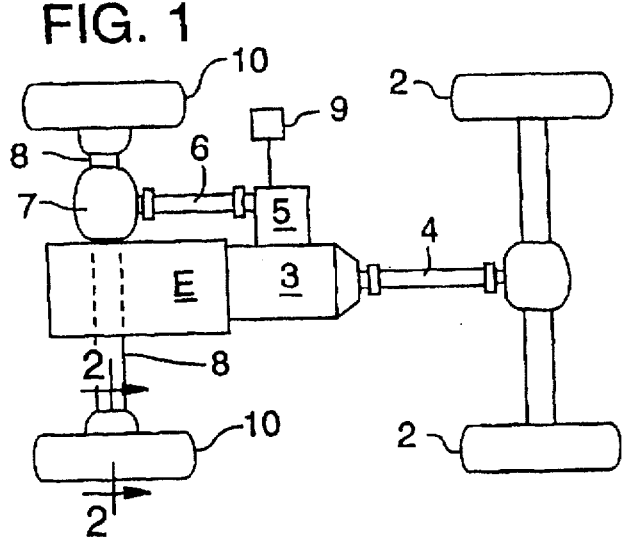
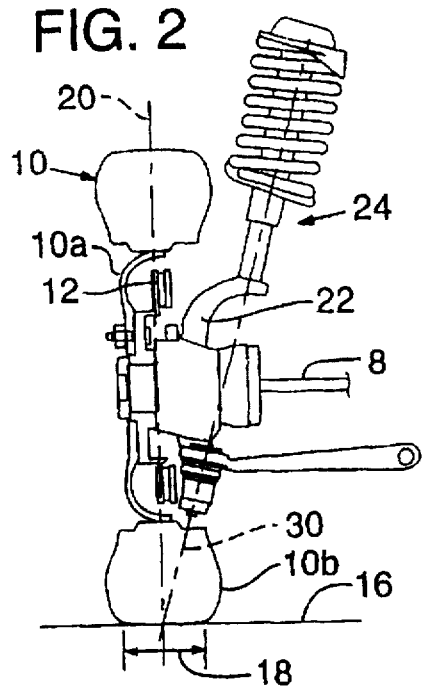
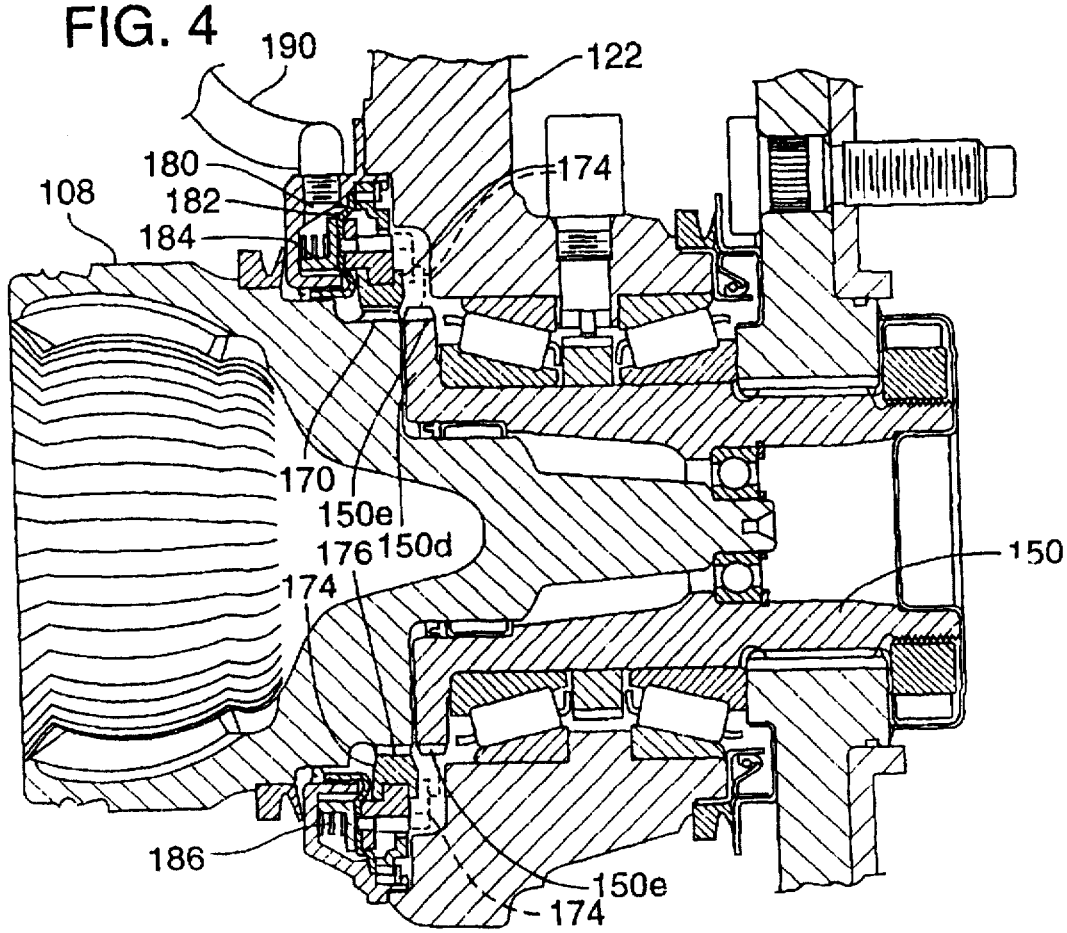

INTEGRATED WHEEL END SYSTEM

FIELD OF THE INVENTION

This invention relates to an integrated wheel and system, or unit, for a vehicle, and more particularly, to such a system which includes a clutch shiftable between positions for connecting and disconnecting drive and driven components thereof to render selected wheels passive or power-driven.

BACKGROUND OF THE INVENTION

This invention has particular application to four-wheel drive vehicles wherein the front wheels or the rear wheels are engaged to be driven by the drive train only as required. For purposes of discussion, the rear wheels will be treated as constantly driven, and the front wheels will be referred to as the set of wheels that are selectively engaged to be driven by the drive train. A transfer case coupled to the vehicle transmission has suitable gearing to be engaged or disengaged as needed. The engagement of the transfer case gearing selectively supplies power to the front drive train which will drive the front wheels. It is desirable to be able to engage the front wheels with the front drive train when the front drive train is under power and to disengage the wheels when the front drive train is idle. This disengagement of the front wheels from the drive train prevents forced rotation of the drive train as a result of the front wheels being driven as the vehicle is propelled.

It thus will be appreciated that in the example given, there are two positions in the drive train in which a connect/disconnect mechanism is required. For purposes of explanation, the invention will hereafter be discussed merely in relation to a wheel end unit, recognizing that such can be either for a front wheel or a rear wheel, depending upon which portion of the vehicle has primary drive function.

Generally in four-wheel drive vehicles where a connect/disconnect hub system is provided, the vehicle has a support coupled to the frame of the vehicle defining a bearing for the hub, and the wheel is mounted laterally outwardly on the vehicle from the support. Prior connect/disconnect hub systems usually are mounted laterally outwardly from the support and within the confines of the center of the wheel.

These prior devices generally have required units which extend laterally outwardly beyond the vehicle to house the operating mechanism necessary to provide the connect/disconnect feature. Since such must fit within the confines of the central portion of the wheel, they generally have had smaller diameter parts which rotate relative to each other in a disconnect position, and have splines or other interlock means which interconnect to lock them for driven operation. Due to part diameter limitations such prior devices have required substantially heavy elements to transmit the necessary torque to the wheel under driving conditions.

Further, such prior hubs have had laterally outwardly extending portions which may unsightly or produce other disadvantages.

In prior connect/disconnect hub units bearing sets provided between the support and the hub often have required specially designed bearings and supports due to the configurations of the hub units. Further, the axial dimensions of prior hub units have been such that often it has been difficult to obtain a desirable scrub radius, or steering offset. Explaining further, the scrub radius, or steering offset, may be defined as the distance between the point at which an extension of the king pin axis meets the road surface and the center of the area, or patch, of contact between the tire and the road. Zero offset, or scrub radius, occurs when the king pin axis line intersects the center of the area of contact between the tire and road surface. Positive offset occurs when the king pin axis line is spaced laterally relative to the vehicle from the center of the tire/road contact area. Negative offset occurs when the the king pin axis line intersects the road laterally outwardly relative to the vehicle beyond the center of the tire/road contact area. Appropriate steering offset, or scrub radius, often has been difficult to obtain with prior devices.

BRIEF SUMMARY OF THE INVENTION

A general object of the present invention is to provide a novel integrated wheel end system including a clutch system which is adapted to provide driving engagement/disengagement (connect/disconnect) of a wheel to convert between driven and non-driven modes of wheel movement which overcomes the above-noted disadvantages of prior systems.

More specifically an object of the present invention is to provide a system which includes an elongate spindle having an outer end portion adapted to have a wheel mounted thereon, and an inner portion disposed inwardly toward the center of the vehicle with a flange extending radially outwardly therefrom with engaging elements formed thereon, a drive element adapted to be rotated under power adjacent to the flange with engaging elements arrayed thereabout, and a clutch member shiftable between an engaging position, whereby the spindle is driven by powered rotation of the drive element, and a non-engaging position in which no driving connection is produced therebetween.

In accordance with one embodiment of the invention, the spindle is a live spindle which is supported by bearings in a support coupled to the frame of the vehicle with the radially directed flange of the spindle disposed inwardly toward the center of the vehicle from the bearing support. The flange extends radially outwardly from remainder portions of the spindle to be engaged by a clutch member which selectively interconnects it to the drive member. Due to its position within the system the radially outwardly directed flange may be of a greater diameter than generally found in prior hub clutch systems, and it is possible to exert greater rotational torque and transmit such to the wheel assembly with lighter parts required. Explaining further, less tangential force is required at the greater diameter engaging position of the flange to produce needed torque for the system and thus lighter spindle materials and connector members may be used than has been possible previously.

Another object of the present invention is to provide a novel clutch system for engagement/disengagement of a wheel to convert between driven and non-driven modes of wheel movement which is axially more compact than previous devices and also permits the use of standard, less expensive bearing assemblies while still providing sufficient support for the unit.

Yet another object of the present invention is to provide a novel clutch system in which the actuating mechanism to engage/disengage between driven and non-driven modes is mounted in a relatively protected region inwardly on the primary support and is simple and effective in its operation.

Yet another object of the invention is to provide sealed sensing means directed toward a portion of the rotating mechanism in a wheel end system to sense various operational characteristics thereof.

A still further object and advantage of the present invention is to provide a novel integrated wheel end unit which

3 permits reduction of the scrub radius, or steering offset, to provide optimum driving performance.

BRIEF DESCRIPTION OF THE DRAWINGS

FIG. 1 is a schematic view of a vehicle drive system as contemplated incorporating the present invention.

FIG. 2 is an enlarged schematic view taken generally along line 2—2 in FIG. 1 with a wheel end system, or unit, according to an embodiment of present invention mounting a wheel;

FIG. 4 is an enlarged cross-sectional view similar to FIG. 3 of another embodiment of an integrated wheel end system, or unit, according to the invention.

DESCRIPTION OF PREFERRED EMBODIMENT

Figure 3:
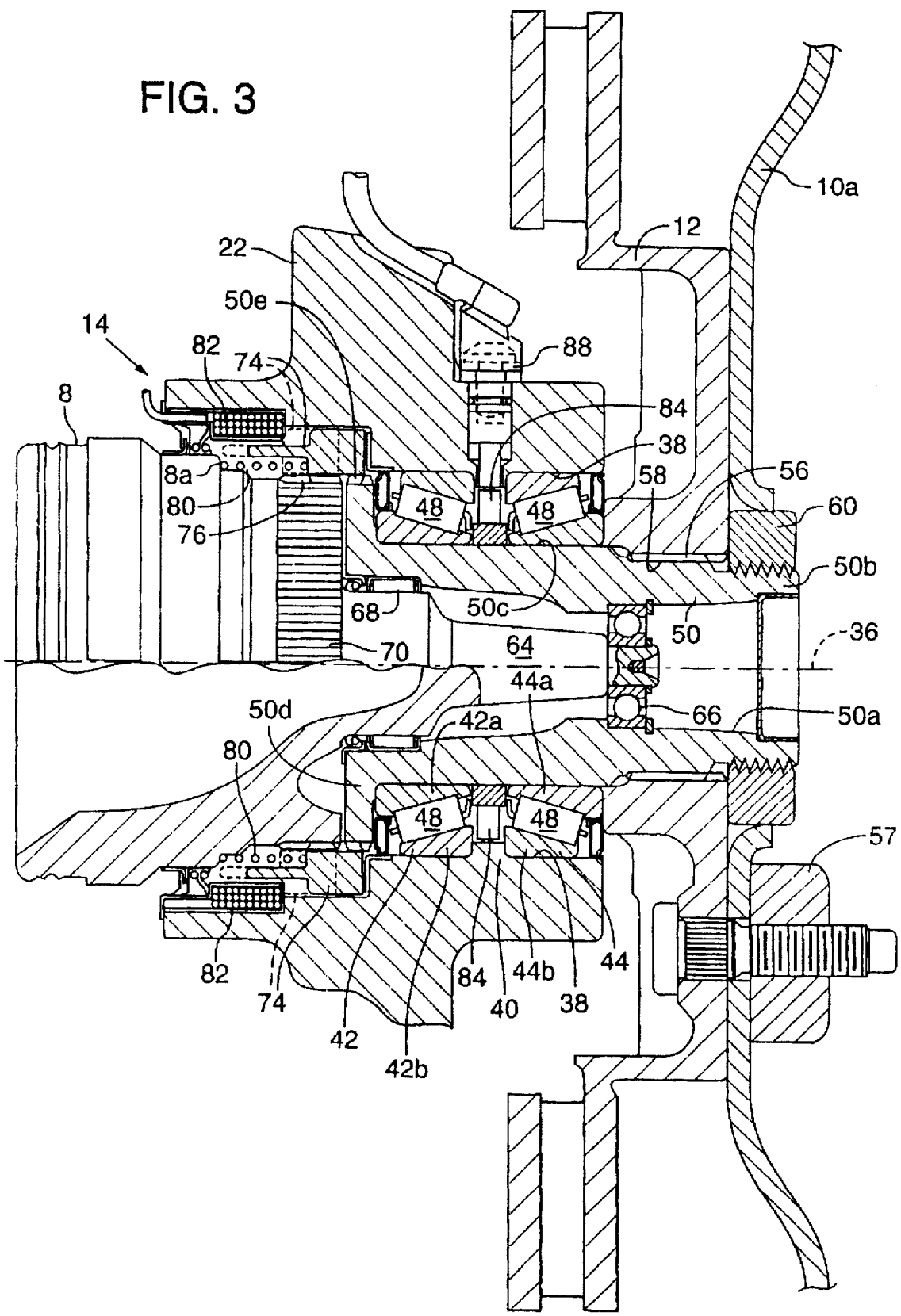
FIG. 3 is an enlarged cross-sectional view of an integrated wheel end system, or unit, constructed according to an embodiment of the present invention taken generally along line 2—2 in FIG. 1.

Referring now to FIG. 1, this illustrates the drive mechanism for a part-time four-wheel drive vehicle. The rotative power of the vehicle engine E is transmitted to the rear wheels 2 by a transmission 3 rotating a rear propeller shaft 4. In the embodiment described herein, the rear wheels 2 are the primary drive wheels and generally are driven full time.

The rotative power of engine E is transmitted to the front wheels 10 by a transfer case 5, coupled to transmission 3, that rotates a front propeller shaft 6 coupled to a front differential 7. Axles, or drive shafts, 8 extend laterally outwardly to oppposite sides of the center of the vehicle from differential 7 to rotate front wheels 10. The wheels 10 are mounted on integrated wheel end assemblies, of hubs, 14 which are not visible in FIG. 1, but which are illustrated in subsequent figures and further described below.

As is known, the transfer case 5 has shift mechanism, which may be actuated by an operator from a remote location on the vehicle through a selector indicated at 9, to either provide rotative power to the front propeller shaft 6 or to not provide such rotative power. Thus, the vehicle may be operated in two-wheel drive (wherein only rear wheels 2 are driven) or in four-wheel drive (where all of wheels 2 and 10 are driven) depending on the shift selection of the transfer case.

Referring to FIG. 2 each of wheels 10 includes a metal wheel portion 10a and tire portion 10b. Wheel 10 is secured to a wheel mounting rotor 12 mounted on the vehicle by an integrated wheel end system, or unit, 14, constructed according to an embodiment of the present invention.

Tire 10b runs on a road surface 16 and contacts the road surface in a contact area, or patch, denoted generally at 18. A vertical center line 20, bisects the wheel and patch 18.

A steering knuckle, or support, 22, is coupled, or mounted, to the vehicle frame through suspension structure 24. The axis about which the wheel is pivotable, or steerable, is termed the king pin axis, denoted at 30. With the structure of the wheel end unit of the present invention, the king pin axis 30 may be positioned to intersect center line 20 where such meets the road, as indicated in FIG. 2. This produces what is referred to as zero offset, or scrub radius.

Axle, drive shaft, 8, is connected at its outboard end to wheel end system 14, and remainder portions thereof extend laterally inwardly toward the center of the vehicle to operative drive connection with differential 7.

The usual operation of such a vehicle is to have one set of wheels constantly driven (such as the rear wheels) and the other set of wheels (such as the front set of wheels) engaged for driving under power as needed. Driving power is transmitted to the front wheels by the transfer cases which may be actuated either by the operator or actuated automatically in an on-demand basis, dependent upon the type of transfer case used.

FIG. 3 illustrates in an enlarged cross-sectional view, an integrated wheel end unit, or system, 14 according to an embodiment of the invention. It will understood that the axle drive shaft 8 and wheel 10 can remain coupled and the vehicle shifted between two-wheel and four-wheel drive solely through the actuation of the transfer case. However, if clutch mechanism, as will be described in greater detail below, in the wheel end unit remains coupled to the axle when the vehicle is driven in two-wheel drive mode, the wheels 10 will force rotation of axle 8. This is undesirable as it consumes power and causes unnecessary wear to the portion of the drive train connected to axle 8. The front wheels 10 thus preferably are drivingly connected to axles 8 only while operating the vehicle in four-wheel drive.

FIG. 3 illustrates a portion of a knuckle, or support, 22, an outer end portion of axle 8, a portion of wheel 10 and clutch mechanism for coupling and uncoupling the wheel to the axle. The wheel mounting is of the live spindle type, as used herein meaning that the spindle provides bearing support for the wheel. The assembly has a central axis 36 extending laterally of the vehicle.

As mentioned previously, knuckle 22 is supported on the frame of the vehicle through suspension structure noted generally at 24. The knuckle, or support, has an internal cylindrical bore 38 defining a bearing enclosure. A circumferential rib 40 is formed intermediate the ends of bore 38.

A pair of spaced apart roller bearing assemblies 42, 44 are mounted and supported in bearing enclosure, or bore, 38, with one bearing assembly on one side of rib 40 and the other bearing assembly on the opposite side. The bearing assemblies include inner bearing races 42a, 44a and outer bearing races 42b, 44b, respectively. The radially inwardly facing surfaces of races-42b, 44b are inclined at opposite angles relative to central axis 36 of the assembly, whereas the radially outwardly directed faces of inner races 42a, 44a are inclined at angles parallel to the facing surfaces of their respective outer races. A plurality of rollers 48 are rotatably received between the inner and outer races. The structure of the system of the invention is such that standard, commercially available bearing assemblies may be used.

An elongate cylindrical spindle 50 is received and supported in the inner bearing support portions of inner races 42a, 44a. Spindle 50 is an elongate hollow tubular member having an inner bore 50a. The spindle has an outer end portion 50b, spaced laterally outwardly from knuckle 22, with screws threads 54, adjacent its outermost end. A series of splines 56 are arrayed peripherally about the outer surface of the spindle adjacent screw threads 54, with the splines extending axially, parallel to axis 36.

Wheel mounting rotor 12 has a splined bore 58 extending therethrough. The splines in bore 58 engage splines 56 on the spindle, such that when the rotor is mounted on the spindle it is secured against rotation relative thereto. A mounting nut 60 screwed onto threads 54 secures rotor 12 on the outer end portion of the spindle. The wheel 10, in turn, is secured to rotor 12 by multiple nut and bolt combinations, such as that indicated at 57.

Proceeding laterally inwardly, toward the center of the vehicle, from splined section 56, the central portion of the spindle has a cylindrical outer surface 50c of a diameter to fit within the inner races 42a, 44a of the bearing assemblies.

At the inner end, or portion, of spindle 50 a circular flange 50d extends radially outwardly beyond the outer diameter of central portion 50c. The diameter of flange 50d in the illustrated embodiment is at least 40% greater than the outer diameter of portion 50c of the spindle. The outer peripheral rim of flange 50d has outwardly directed teeth, or engaging elements, 50e arrayed thereabout.

The mounting of spindle 50 is such, that it and the wheel attached thereto are rotatably supported by assemblies 42, 44 for relatively free rotation in support knuckle 22.

Referring still to FIG. 3, an end portion 64 of axle 8 is smaller in diameter than the internal bore 50a of the spindle and extends axially into the spindle. Two spaced apart roller-bearing assemblies 66, 68 are interposed between bore 50a of the spindle and end portion 64 of axle 8, to rotatably support the end portion of the axle within the spindle. Axle 8 and spindle 50 thus have a substantially common axis of rotation which coincides with central axis 36.

Axle 8 has a plurality of teeth, or engaging elements, 70 arrayed about its peripheral edge adjacent teeth 50e on flange 50d of the spindle. Teeth 70 and 50e are substantially common in shape and spacing for the purpose to be described below.

A rotatable cylindrical ring gear 74, also referred to as a clutch member, has a plurality of inwardly directed engaging elements, or teeth, 76 which are sized and positioned to mesh with teeth 70 on axle 8 and teeth 50e on flange 50d. The ring gear is slidable axially in the assembly, parallel to axis 36. The ring gear is shown in a first, non-driving, position in dashed outline in FIG. 3 in which the ring gear teeth 76 are in engagement only with teeth 70 on axle 8. Teeth 76 do not engage teeth 50e in this position. The ring gear is shiftable axially to a second, driving, position as illustrated in solid line in FIG. 3, in which the teeth 76 on the ring gear concurrently engage teeth 70 and 50e. This produces a driving connection between axle 8 and spindle 50 to drive wheel 10.

In the embodiment of FIG. 3 actuation to produce axial shifting of ring gear 74 is provided by a compression spring 80 and an electromagnetic actuator 82. Explaining further, compression spring 80 is interposed between ring gear 74 and a shoulder 8a on axle 8 to urge the ring gear under a selected spring biasing force, to the right in FIG. 3 toward its position of driving engagement with the axle and spindle as illustrated in solid outline in FIG. 3.

Electromagnetic actuator 82 comprises an electromagnetic ring secured to support 22, to which ring electrical power may be supplied as desired. Ring gear 74 is made of magnetically attractable material. Upon actuation of electromagnet 82, the ring gear is drawn by magnetic force to the first position illustrated in dashed outline in FIG. 3, out of engagement with teeth 50e on flange 50d of the spindle. The electromagnet 82 induces a force on the ring gear toward this first position which is greater than the force imposed thereupon by spring 80, such that the spring 80 is compressed and the ring gear is moved out of contact with the spindle. Conversely, when the electromagnet is not actuated, the spring 80 urges the ring gear 74 to an interlocked position as illustrated in solid outline in FIG. 3 providing driving connection between axle 8 and spindle 50.

An indicator ring 84 is mounted on and rotatable with spindle 50. A sensor unit, such as an optical sensor, 88 is mounted in knuckle support 22 and is directed toward indicator ring 84. This sensor may be such as to sense rotation of spindle 50 and the wheel mounted thereon for proper actuation of an antilock braking system, or to determine temperatures or other characteristics of the spindle/hub assembly. By being fixedly mounted and secured within the knuckle assembly, the sensor unit is protected against damage and the elements. There are seals throughout the assembly which have not been described in detail herein, but which provide sealing between rotating parts to prevent the intrusion of dirt, moisture, etc.

A second embodiment of the invention is illustrated in FIG. 4. The general construction of this embodiment is substantially similar to that previously described in FIG. 3. However, in place of the electromagnetic actuator, a fluid pressure actuator is used. Explaining further, an axle 108 has teeth 170 arrayed peripherally thereabout. These teeth are contiguous to teeth 150e on flange 150d of a spindle 150.

A ring gear 174, having inwardly directed teeth 176, is shiftable between the two positions illustrated in solid and dashed outline in FIG. 4. In the solid line position of FIG. 4, teeth 176 on the ring gear engage only teeth 170 on axle 108. When ring gear 174 is shifted laterally outwardly to the position illustrated in dashed line in FIG. 4, teeth 176 on the ring gear concurrently engage teeth 170 and 150e on the axle and spindle to provide a driving interconnection between axle 108 and spindle 150.

The actuator for shifting ring gear 174 between these two positions is fluid pressure operated. It includes a ring-shaped reservoir 180 secured to support 122. A flexible diaphragm 182 encloses the outwardly facing margin of reservoir 180 and is backed by a ring 184. A compression spring 186 within the reservoir urges ring 184 and diaphragm 182 outwardly, to the position illustrated at the top half of FIG. 4. Ring gear 174 is coupled to diaphragm 182 and ring 184 for shifting therewith.

A fluid pressure line, or conduit, 190 communicates with the interior of reservoir 180. When it is desired to shift the ring gear 174 to its non-engaging position, as illustrated in solid line in FIG. 4, a lower-than-ambient pressure is drawn in conduit 190 and reservoir 180 and the diaphragm is drawn to the position illustrated in solid line in FIG. 4 pulling ring gear 174 therewith. When it is desired to provide interlock between the axle and spindle, the lower-than-ambient pressure in conduit 190 is released and spring 186 urges ring 184, diaphragm 182, and ring gear 174 into engaging position as illustrated in dashed line in FIG. 4.

In each of the embodiments illustrated, the wheel, mounted on spindle 50 through rotor 12, is generally freely rotatable through the mounting of spindle 50 in bearing assemblies 42, 44 in support knuckle 22 when the ring gear is disengaged. Due to the design and construction of the support knuckle and spindle, commercially available off-the-shelf bearing assemblies may be used, since adequate space is provided therebetween to allow good support for the spindle.

With the radially directed flange on the spindle and the actuating mechanism positioned well inwardly in the hub assembly, they are protected. Further, due to the increased diameter of the engaging flange on the spindle increased torque transmission is permitted without undue mass requirements. An added benefit of this structure is that the actuator for the clutch may be secured to a relatively stable support. Thus control conduits, such as electrical conductor to electromagnet 82 or conduit 190 to reservoir 180, may be conveniently mounted and protected.

In operation it is a simple matter to disengage the clutch by actuation of the electromagnet 82 in the embodiment illustrated in FIG. 3, or by producing a lower-than-ambient pressure in the actuator of the FIG. 4 embodiment. This shifts the ring gears 74, 174, to positions out of engagement with the teeth on the flange of the spindle to permit freewheel operation. When it is desired to engage the driving interconnection between the axle and spindle, the electromagnet 82 in the FIG. 3 embodiment or the lower-than-ambient pressure supply 190 in the FIG. 4 embodiment, are deactivated and their respective biasing springs urge the ring gear element into concurrent engagement with the peripherally formed teeth on the axle and spindle. Driving connection thus is provided between the axle, spindle, and wheel.

Although an electromagnet actuator is illustrated in one embodiment and a lower-than-ambient fluid pressure actuator is illustrated in the second embodiment, it should be recognized that other forms of shifting mechanisms may be used in the device also. These could be in the form of hydraulics, solenoids, other pneumatic devices, flexible cables, mechanical cams, fork interconnections, and many others.

Although preferred embodiments of the invention have been described herein, it should be apparent to those skilled in the art that variations and modifications are possible without departing from the spirit of the invention.

I claim:

1. An integrated wheel end system for a vehicle including a clutch adapted to provide driving engagement/disengagement of a wheel to convert between driven and non-driven modes of wheel movement, said system comprising, a support coupled to the frame of the vehicle, an elongate cylindrical spindle mounted on said support for relatively free rotation about the central axis of the spindle, said spindle having an outer end portion spaced outwardly from the support adapted to have a wheel mounted thereon, an inner portion disposed inwardly toward the center of the vehicle from the outer end portion, a flange extending radially outwardly from said inner portion, and engaging elements formed on said flange adjacent the periphery thereof, a drive element adapted to be rotated under power adjacent the flange of the spindle and having engaging elements arrayed thereabout, and a clutch member mounted adjacent the engaging elements of the spindle flange and the drive element shiftable substantially parallel to the central axis of the spindle between a first position engaging the engaging elements of both said spindle and drive element to produce a driving connection therebetween whereby the spindle is driven by powered rotation of the drive element and a second position in which no driving connection is produced permitting the spindle to rotate freely of the drive element, wherein the engaging elements on the spindle and drive element comprise outwardly directed teeth disposed at the outer peripheral edges of the spindle and drive member, and said clutch member comprises a ring gear having radially inwardly directed teeth which engage the teeth on the spindle and drive element when in the first position and are out of engagement with the teeth on at least one of the spindle and drive element in the second position.

2. The system of claim 1, wherein said support comprises a bearing enclosure and a bearing is mounted in said bearing enclosure to rotatively mount the spindle in said support, said bearing engaging the spindle between the outer end portion of the spindle and the flange.

3. The system of claim 1, which further comprises shifting mechanism for selectively shifting the clutch member between said first and second positions.

4. The system of claim 3, wherein said shifting mechanism comprises an actuator selectively operable to induce a force operable to move the clutch member from one of said positions to the other of said positions, and biasing means acting against the clutch member to urge movement of the clutch member in the opposite direction, said biasing means generating less force than said actuator.

5. The system of claim 4, wherein said actuator comprises an electromagnetic device which when activated produces shifting of the clutch member.

6. The system of claim 4, wherein said actuator comprises a fluid pressure device which when activated produces shifting of the clutch member.

7. The system of claim 1, wherein said support comprises a bearing enclosure, the spindle has a cylindrical outer surface portion intermediate the outer end portion and the flange, said bearing enclosure has an inner bore surface coaxial with the axis of the spindle and surrounds the cylindrical outer surface portion of the spindle, and a bearing is interposed between and provides rotative support between said inner bore surface of the bearing enclosure and the spindle.

8. The system of claim 1, wherein the spindle has a central portion of a first outer diameter intermediate the outer end portion and inner end portion, and said flange extends radially outwardly beyond said first diameter.

9. The system of claim 8, wherein the diameter of said flange is at least 40% greater than said first diameter.

10. The system of claim 9, wherein said engaging elements on the flange comprise teeth arrayed about the periphery of the flange.

11. An integrated wheel end system for a vehicle including a clutch adapted to provide driving engagement/disengagement of a wheel to convert between driven and non-driven modes of wheel movement, said system comprising, a knuckle support coupled to the frame of the vehicle defining a bearing enclosure, an elongate cylindrical spindle rotatably mounted within the bearing enclosure having an outer end portion spaced outwardly from the support adapted to have a wheel mounted thereon, an inner portion disposed inwardly toward the center of the vehicle from the outer end portion, and a flange extending radially outwardly from said inner portion having teeth arrayed about the periphery thereof, an axle adapted to be driven under power and having a connector portion adjacent said flange portion of the spindle having teeth arrayed thereabout contiguous to the teeth on the flange, and a clutch member comprising a ring gear having inwardly directed teeth for selectively interconnecting the teeth on the flange and axle, said ring gear being slidably mounted relative to the flange and connector portion for movement between a first position interlocking the flange and connector portion and a second position permitting relatively free rotative movement therebetween.

12. The system of claim 11, wherein said spindle defines a further bearing enclosure, and a portion of said axle is rotatably mounted within the bearing enclosure of the spindle.

13. The system of claim 11, which further comprises actuator means selectively operable by an operator remote from said wheel to move said clutch member between said first and second positions.

14. The system of claim 11, which further comprises an actuator selectively operable to induce a force operable to move the clutch member from one of said positions to the other of said positions, and biasing means acting against the clutch member to urge movement of the clutch member in the opposite direction, said biasing means generating less force than said actuator.

15. The system of claim 11, wherein said spindle has a central portion of a first outer diameter intermediate the outer end portion and inner portion, and said flange extends radially outwardly beyond said first diameter.

16. The system of claim 11, which further comprises a sensor fixedly mounted on said support and directed at said spindle to sense a selected operating characteristic of said spindle.

17. A wheel mounting system incorporating a clutch mechanism for engaging and disengaging a wheel and drive shaft of a vehicle to convert between two-wheel and four-wheel drive wherein the clutch mechanism is disposed inwardly toward the center of the vehicle from the wheel, the system comprising an elongate spindle with a central axis having an outer end portion adapted to have a wheel mounted thereon, an inner portion disposed inwardly toward the center of the vehicle from the outer end portion, an intermediate portion between the outer end portion and inner portion having a cylindrical outer surface, and a flange on said inner portion extending radially outwardly from a distance beyond the outer surface of the intermediate portion, a support engaging and supporting the intermediate portion of the spindle for rotation about its central axis, a drive axle adapted to be rotated under power, a clutch member mounted for movement relative to the drive axle and flange between a first position interlocking the axle and flange and a second position permitting free relative rotation therebetween, wherein the flange and axle have engaging elements arrayed about their peripheries, and said clutch member is mounted adjacent the engaging elements of the flange and axle and in its first position concurrently engages the engaging elements of both the flange and axle and in said second position is out of engagement with the engaging elements on at least one of said flange and axle.

18. The system of claim 17, wherein the outer surface of the intermediate portion has a first diameter and said flange has a diameter which is at least 40% greater than said first diameter.

19. The system of claim 17, which further comprises an actuator selectively operable to induce a force operable to move the clutch member from one of said positions to the other of said positions, and biasing means acting against the clutch member to urge movement of the clutch member in the opposite direction, said biasing means generating less force than said actuator.

20. An integrated wheel end system for a vehicle including a clutch adapted to provide driving engagement/disengagement of a wheel to convert between driven and non-driven modes of wheel movement, said system comprising, a support coupled to the frame of the vehicle, an elongate cylindrical spindle mounted on said support for relatively free rotation about the central axis of the spindle, said spindle having an outer end portion spaced outwardly from the support adapted to have a wheel mounted thereon, an inner portion disposed inwardly toward the center of the vehicle from the outer end portion, a flange extending radially outwardly from said inner portion, engaging elements formed on said flange adjacent the periphery thereof, and a hollow tubular portion, a drive element adapted to be rotated under power adjacent the flange of the spindle, having engaging elements arrayed thereabout and having a portion which extends axially into the hollow tubular portion of the spindle and is rotatably supported therein, and a clutch member mounted adjacent the engaging elements of the spindle flange and the drive element shiftable between a first position engaging the engaging elements of both said spindle and drive element to produce a driving connection therebetween whereby the spindle is driven by powered rotation of the drive element and a second position in which no driving connection is produced permitting the spindle to rotate freely of the drive element.

21. An integrated wheel end system for a vehicle including a clutch adapted to provide driving engagement/disengagement of a wheel to convert between driven and non-driven modes of wheel movement, said system comprising, a knuckle support coupled to the frame of the vehicle defining a bearing enclosure, an elongate cylindrical spindle rotatably mounted within the bearing enclosure having an outer end portion spaced outwardly from the support adapted to have a wheel mounted thereon, an inner portion disposed inwardly toward the center of the vehicle from the outer end portion, a flange extending radially outwardly from said inner portion, and a hollow tubular portion opening toward the center of the vehicle, an axle adapted to be driven under power having a connector portion adjacent said flange portion of the spindle, and a portion of the axle extends axially into the hollow tubular portion of the spindle and is rotatably supported therein, and a clutch member slidably mounted relative to the flange and connector portion for movement between a first position interlocking the flange and connector portion and a second position permitting relatively free rotative movement therebetween.

22. The system of claim 21, wherein the spindle has a cylindrical outer surface portion intermediate the outer end portion and the flange, said bearing enclosure has an inner bore surface coaxial with the spindle and surrounding the cylindrical outer surface portion of the spindle, and a bearing assembly is interposed between and provides rotative support between said inner bore surface of the bearing enclosure and said outer surface portion of the spindle.

23. The system of claim 22, wherein said bearing assembly comprises first and second roller bearing units interposed between said inner bore surface of the bearing enclosure and spaced apart axially of the spindle.

* * * * *